March 21, 1950 W. E. DENISON 2,501,033
INDICATOR
Filed June 26, 1944 3 Sheets-Sheet 1
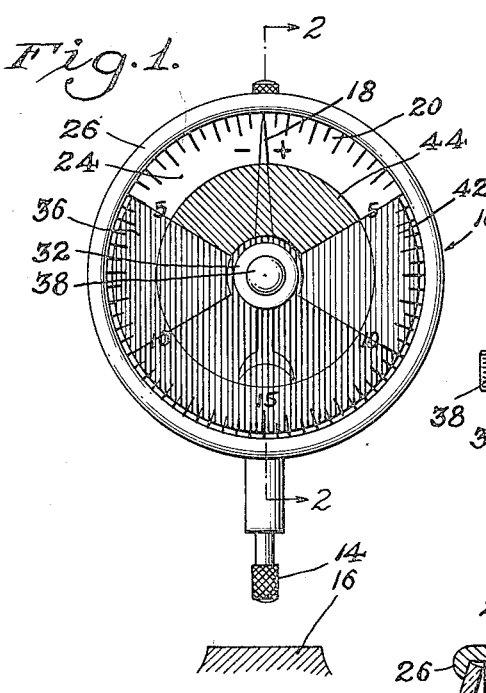
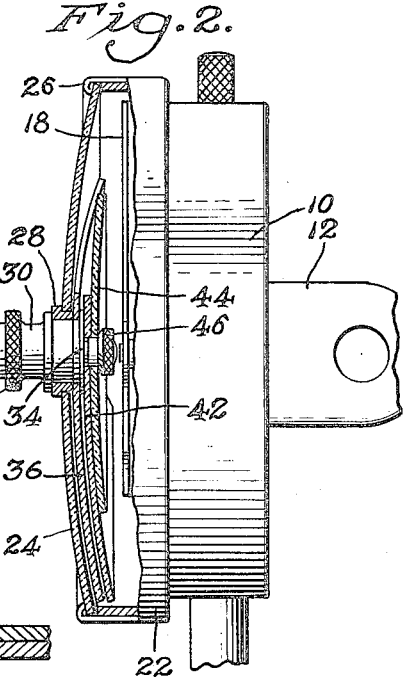
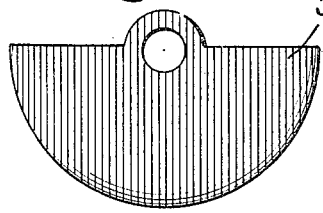
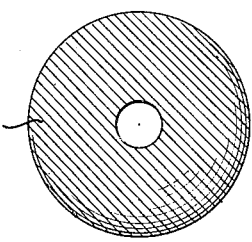
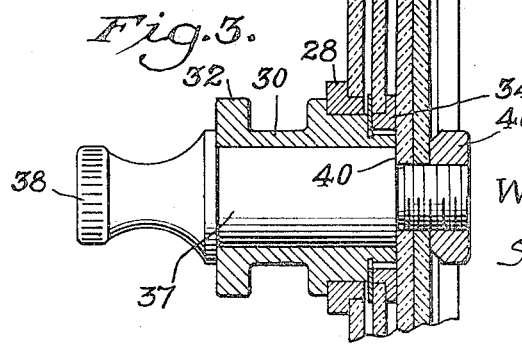
Inventor
William E. Denison
By
Soans, Pond & Anderson
Attorneys.

March 21, 1950 W. E. DENISON 2,501,033
INDICATOR
Filed June 26, 1944 3 Sheets-Sheet 2
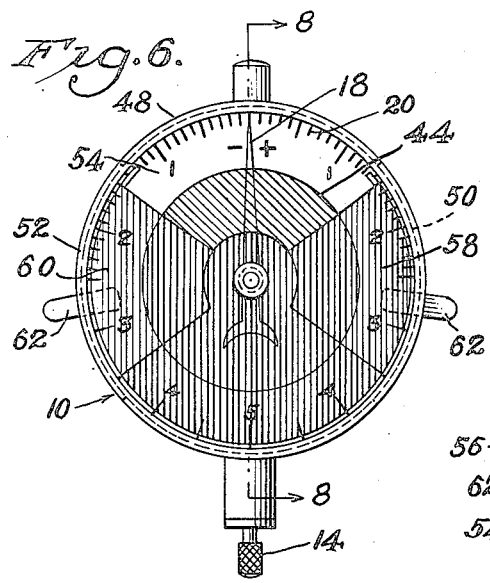
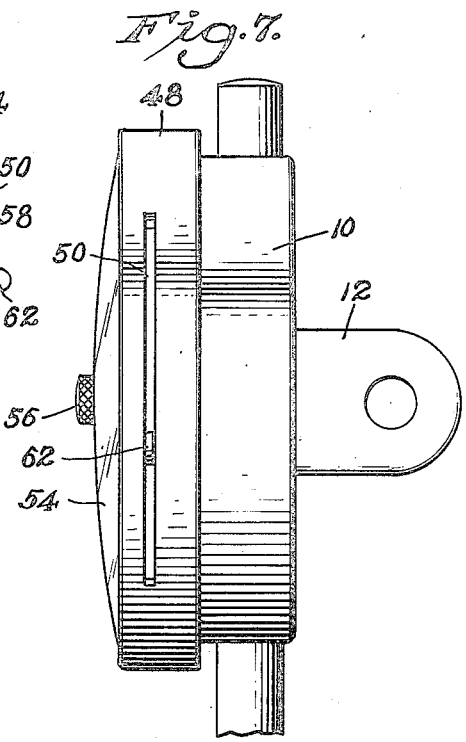
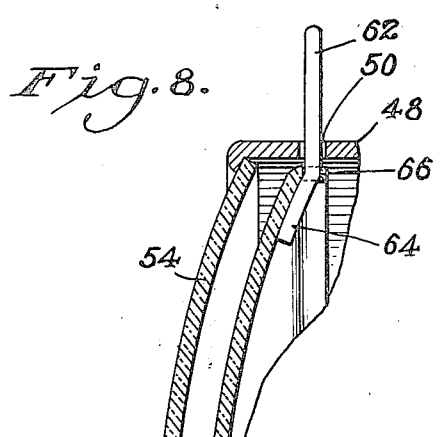
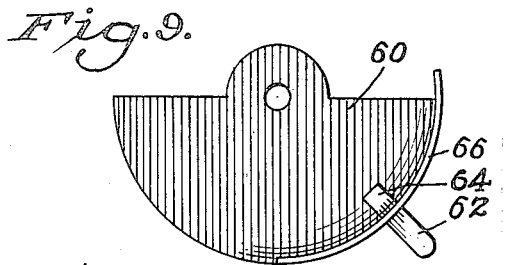
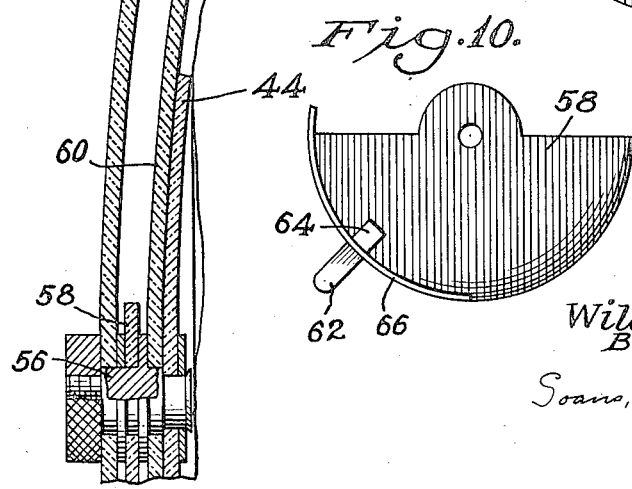
Inventor
William E. Denison
BY
Soans, Pond & Anderson
Attorneys.

March 21, 1950 W. E. DENISON 2,501,033
INDICATOR
Filed June 26, 1944 3 Sheets-Sheet 3
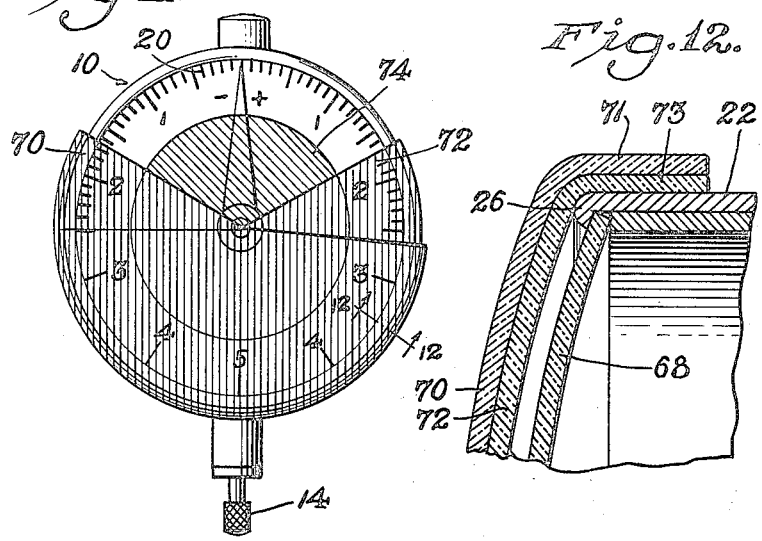
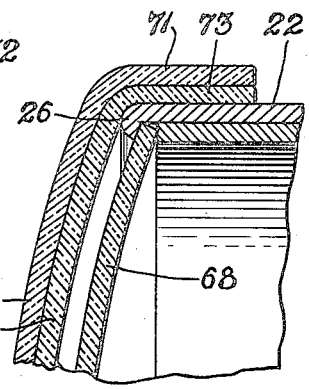
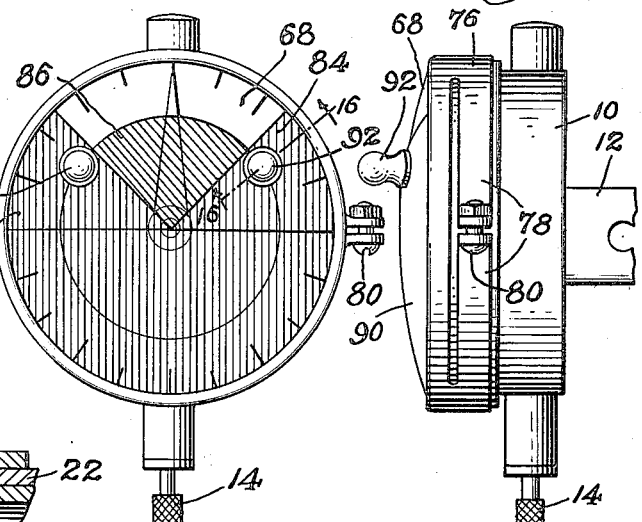
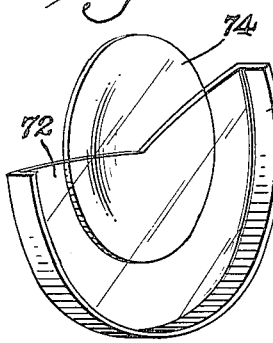
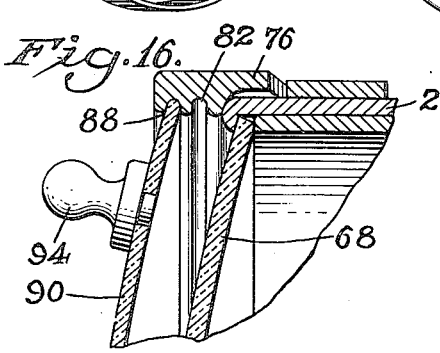
Inventor
William E. Denison
By
Soans, Pond and Anderson
Attorneys.

Patented Mar. 21, 1950

2,501,033

UNITED STATES PATENT OFFICE 2,501,033

INDICATOR

William E. Denison, Chicago, Ill.

Application June 26, 1944, Serial No. 542,135

14 Claims. (Cl. 116—129)

The present invention relates to inspection of precision machine parts and includes among its objects and advantages an improvement in indicators of particular significance in facilitating and speeding up the work of inspecting parts whose dimensions must be precise and accurate within predetermined limits.

In the accompanying drawings,

Figure 1 is a front elevation of an indicator, illustrating the application of the principles of my invention thereto;

Figure 2 is a side elevation of the same indicator, partly in section on line 2—2 of Figure 1;

Figure 3 is an enlarged sectional detail also on line 2—2 of Figure 1;

Figure 4 is an elevation of one of the red cover members;

Figure 5 is a front view of the central green cover member;

Figure 6 is a front view of a modified construction;

Figure 7 is a side elevation of the device in Figure 6;

Figure 8 is an enlarged radial section of the screens of Figure 6 on line 8—8 of Figure 6;

Figure 9 is a detail of one of the screens of Figure 6;

Figure 10 is a detail of the other screen of Figure 6;

Figure 11 is a front elevation of a further modification;

Figure 12 is a detailed section as on line 12—12 of Figure 11;

Figure 13 is a prospective of one of the cells according to Figure 11;

Figure 14 is a front elevation of a further modification;

Figure 15 is a side elevation of the modification of Figure 14;

Figure 16 is an enlarged section as on line 16—16 of Figure 14.

In the embodiment of the invention selected for illustration in Figures 1 to 5 inclusive, I have indicated a conventional gauge 10 which may be provided with a supporting lug 12 for mounting on a suitable fixture in a position such that a machine part may be interposed between the lower end of the vertical slide plunger 14 and any suitable support or holder indicated at 16, for determining whether the part has been machined to the right dimension. Suitable conventional transmission mechanism, not shown, transmits the vertical sliding movement of the plunger 14 to the indicator needle 18 which moves close to the face of the dial 20, on which graduations appear representing 0.001 inch or 0.0001 inch or 0.0001 millimeter, as may be desired. It will be apparent that after proper adjustment of the supports 12 and 16, the positioning of a finished piece between the plunger 14 and support 16 will lift the plunger and cause the needle 18 to rotate to a position determined by the dimensions of the part to be inspected. Further, the parts can readily be adjusted so that if the part to be inspected is of exactly the right dimension the needle 18 will occupy the position shown in Figure 1 but if it is too small the point of the needle will be to the left of the position shown in Figure 1 and if it is too large the point of the needle will be to the right.

According to the invention the enlarged front portion 22 of the gauge includes a transparent cover plate 24 retained by the bead or bezel 26. The cover 24 carries a central bearing 28 which rotatably supports a sleeve 30 having knurled flange at 32 and suitable attachment means at 34 for clamping engagement with a sector 36, which is of transparent material but tinted red. Journaled inside the sleeve 30 is a shaft 37 having a knurled head at 38 and a shoulder at 40 for abutment with a segment 42. which is identical in configuration and color with the segment 36. The shaft 37 also carries a circular transparent plate 44, the plate 44 and sector 42 being clamped to the shaft by the nut 46.

It will be apparent upon reference to Figures 1 and 4 that, since each of the sectors 36 and 42 occupy only 180°, they may be adjusted by means of the knurled heads 32 and 38 to any desired position. The position illustrated in Figure 1 is for the inspection of parts where the permissible variation in size is 0.005 inch plus or minus. The green disc 44 is quite inconspicuous except where it is exposed, and assists the eye of the operator in locating the arcuate portion of the dial still left directly exposed to view.

In the routine inspection of large numbers of parts the repeated reading of a needle or scale represents a serious burden on the eye of the operator. With the transparent shields according to the invention properly adjusted for the work in hand, whenever the part is within the prescribed tolerance, the effort imposed on the eye muscles and nerves of the operator is reduced to a minor fraction of what would otherwise be required, because if a casual glance shows the arcuate exposed portion to contain the dark mark of the needle point anywhere, the operator need not take the time and mental effort to decide where the needle point is.

This reduction in mental effort and eyestrain is even more marked in the case of multiple inspections where a single piece of the material is thrust into a position such that several such gauges are simultaneously moved to indicating position. Even in such cases, where the part is within the inspection tolerances, a glance at the entire field of vision including all the gauges is sufficient to let the operator realize all dimensions are satisfactory. But if any of the white fields stand vacant, then the operator's attention is immediately focused on that particular gauge and the position of the pointer under the transparent red sector can readily be observed and noted so that if the defect is one susceptible of correction the amount of the defect can be noted on the rejection slip, without adjusting anything.

Referring now to Figures 6 to 10 inclusive, I have indicated the same conventional gauge 10 provided with a different front housing 48 containing arcuate slots 50 and 52 on opposite sides. The cover 54 is provided with a central pivot for supporting the sectors 58 and 60 but the sectors are actuated by means of the fingers 62 projecting radially through the slots. In the embodiment illustrated, the finger 62 is a separate piece of material cemented or otherwise suitably attached at 64 to the sector, and the sector is reinforced or stiffened adjacent the finger by the downwardly turned flange 66.

Referring now to Figures 11, 12 and 13, I have indicated the application to the housing 22, of a simpler form of construction. The cover 68 may have an imperforate center, and sectors 70 and 72 occupy each a trifle more than 180°, so they can be pushed over the housing 22 and be held there by the friction of their flanges 71 and 73 with the housing. And the under-sector 72 carries the green bull's-eye 75 affixed to its inner surface.

Referring now to Figures 14, 15 and 16, the housing 22 and the instrument cover 68 are combined with a clamping ring 76 having flexible portions at 78, which may be tightened by the conventional clamp screw 80. The ring has an inner annular groove 82 engaging the edge of the sector 84, which sector carries the bull's-eye 86. The outer annular groove 88 provides similar support for the outer sector 90. The sector 84 carries a stud 92 and the sector 90 carries a stud 94 by means of which the positions of the parts may be adjusted.

Without further elaboration the foregoing will so fully explain my invention that others may readily adapt the same for use under various conditions of service.

I claim:

1. In combination with an indicator having a while dial, and a black pointer rotatable over said dial; a red transparent shield; means for supporting said shield and permitting rotation thereof about the axis of rotation of said pointer; a second red transparent shield overlying said first shield and rotatable about the same axis; said shields being each cut away along radial lines to leave an exposed sector, whereby said shields may be adjusted to leave a predetermined sector of said dial directly exposed to view with a red sector adjacent each radial edge of said exposed sector; said shields being of a degree of transparency sufficient to permit ready observation of the position of said pointer in any position; and a transparent green bull's-eye carried by one of said screens; said bull's-eye at all times covering all but a peripheral arcuate portion of the sector otherwise left exposed by said screens; said dial carrying peripheral indicia located radially outside said bull's-eye.

2. In combination with an indicator having a dial, and a pointer rotatable over said dial; a red transparent shield; means for supporting said shield and permitting rotation thereof about the axis of rotation of said pointer; a second red transparent shield overlying said first shield and rotatable about the same axis; said shields being each cut away along radial lines to leave an exposed sector, whereby said shields may be adjusted to leave a predetermined sector of said dial directly exposed to view with a red sector adjacent each radial edge of said exposed sector; said shields being of a degree of transparency sufficient to permit ready observation of the position of said pointer in any position; and a transparent green bull's-eye carried by one of said screens; said bull's-eye at all times covering all but a peripheral arcuate portion of the sector otherwise left exposed by said screens; said dial carrying peripheral indicia located radially outside said bull's-eye.

3. In combination with an indicator having a dial, and a pointer rotatable over said dial; a red transparent shield; means for supporting said shield and permitting rotation thereof about the axis of rotation of said pointer; a second red transparent shield overlying said first shield and rotatable about the same axis; said shields being each cut away along radial lines to leave an exposed sector, whereby said shields may be adjusted to leave a predetermined sector of said dial directly exposed to view with a red sector adjacent each radial edge of said exposed sector; said shields being of a degree of transparency sufficient to permit ready observation of the position of said pointer in any position; and a transparent green bull's-eye carried by one of said screens; said bull's-eye at all times covering all but a peripheral arcuate portion of the sector otherwise left exposed by said screens.

4. In combination with an indicator having a dial, and a pointer rotatable over said dial; a red transparent shield; means for supporting said shield and permitting rotation thereof about the axis of rotation of said pointer; a second red transparent shield overlying said first shield and rotatable about the same axis; said shields being each cut away along radial lines to leave an exposed sector, whereby said shields may be adjusted to leave a predetermined sector of said dial directly exposed to view with a red sector adjacent each radial edge of said exposed sector; said shields being of a degree of transparency sufficient to permit ready observation of the position of said pointer in any position; said shields being stationary during use of the indicator.

5. In combination with an indicator having a dial, and a pointer rotatable over said dial; a transparent shield; means for supporting said shield and permitting rotation thereof about the axis of rotation of said pointer; a second transparent shield overlying said first shield and rotatable about the same axis; said shields being each cut away along radial lines to leave an exposed sector, whereby said shields may be adjusted to leave a predetermined sector of said dial directly exposed to view with a covered sector adjacent each radial edge of said exposed sector; said shields being of a degree of transparency sufficient to permit ready observation of the position of said pointer in the sectors adjacent said exposed sector; said shields being tinted to give a distinctive coloration to said covered sectors; said shields being stationary during use of the indicator.

6. In combination with an indicator having a dial, and a pointer movable over said dial; a transparent shield; a second transparent shield overlying said first shield; means for supporting said shields and permitting movement thereof before said pointer and dial; said shields being each cut away to leave an exposed area; whereby said shields may be adjusted to leave a predetermined portion of said dial completely exposed to view with covered portions adjacent said exposed portion; said shields being of a degree of transparency sufficient to permit ready observation of the position of said pointer in any position; said shields being tinted to give a distinctive coloration to said covered portions.

7. In combination with an indicator having a dial, and a pointer movable over said dial; a transparent shield; a second transparent shield overlying said first shield; means for supporting said shields and permitting movement thereof before said pointer and dial; said shields being each cut away to leave an exposed area, whereby said shields may be adjusted to leave a predetermined portion of said dial completely exposed to view with covered portions adjacent said exposed portions; said shields being of a degree of transparency sufficient to permit ready observation of the position of said pointer in said covered portions; said shields being tinted to give a distinctive coloration to said covered portions; said supporting means comprising a stationary dial cover; and pivot means at the center of said cover, for supporting both shields for independent rotational adjustment.

8. In combination with an indicator having a dial, and a pointer movable over said dial; a transparent shield; a second transparent shield overlying said first shield; means for supporting said shields and permitting movement thereof before the said pointer and dial; said shields being each cut away to leave an exposed area, whereby said shields may be adjusted to leave a predetermined portion of said dial completely exposed to view with covered portions adjacent said exposed portions; said shields being of a degree of transparency sufficient to permit ready observation of the position of said pointer in said covered portions; said shields being tinted to give a distinctive coloration to said covered portions; said supporting means comprising a stationary dial cover; and pivot means at the center of said cover, for supporting both shields for independent rotational adjustment, said shields being positioned under said stationary cover.

9. In combination with an indicator having a dial, and a pointer movable over said dial; a transparent shield; a second transparent shield overlying said first shield; means for supporting said shields and permitting movement thereof before the said pointer and dial; said shields being each cut away to leave an exposed area, whereby said shields may be adjusted to leave a predetermined portion of said dial completely exposed to view with covered portions adjacent said exposed portions; said shields being of a degree of transparency sufficient to permit ready observation of the position of said pointer in said covered portions; said shields being tinted to give a distinctive coloration to said covered portions; said supporting means comprising a dial housing having two axially spaced circular grooves above said dial; each of said grooves receiving the peripheral edge of one of said shields.

10. In combination with an indicator having a dial, and a pointer movable over said dial; a transparent shield; a second transparent shield overlying said first shield; means for supporting said shields and permitting movement thereof before the said pointer and dial; said shields being each cut away to leave an exposed area, whereby said shields may be adjusted to leave a predetermined portion of said dial completely exposed to view with covered portions adjacent said exposed portions; said shields being of a degree of transparency sufficient to permit ready observation of the position of said pointer in said covered portions; said shields being tinted to give a distinctive coloration to said covered portions; said supporting means comprising a dial housing having two axially spaced circular grooves above said dial; each of said grooves receiving the peripheral edge of one of said shields, said dial housing comprising a main portion, and a detachable annulus clamped on said main portion and supporting said shields.

11. In combination with an indicator having a dial, and a pointer movable over said dial; a transparent shield; a second transparent shield overlying said first shield; means for supporting said shields and permitting movement thereof before the said pointer and dial; said shields being each cut away to leave an exposed area; means whereby said shields may be adjusted to leave a predetermined portion of said dial completely exposed to view with covered portions adjacent said exposed portions; said shields being of a degree of transparency sufficient to permit ready observation of the position of said pointer in said covered portions; said shields being tinted to give a distinctive coloration to said covered portions; said supporting means comprising a dial housing having a circular periphery; a telescoping flange on one shield slidably engaging said housing; and a flange on the other shield telescoping over the flange of said first shield.

12. In combination with an indicator having a dial, and a pointer movable over said dial; a transparent shield; a second transparent shield overlying said first shield; means for supporting said shields and permitting movement thereof before the said pointer and dial; said shields being each cut away to leave an exposed area; means whereby said shields may be adjusted to leave a predetermined portion of said dial completely exposed to view with covered portions adjacent said exposed portions; said shields being of a degree of transparency sufficient to permit ready observation of the position of said pointer in said covered portions; said shields being tinted to give a distinctive coloration to said covered portions; said supporting means comprising a cylindrical dial housing, within which said shields are rotatably nested; each shield having a radial finger projecting from its periphery through said housing; said housing having an arcuate slot receiving each finger and permitting a predetermined extent of movement.

13. In combination with an indicator having a dial, and a pointer movable over said dial; transparent shield means before the said pointer and dial; said shield means leaving a predetermined portion of said dial completely exposed to view with covered portions adjacent said exposed portions; said shield means being of a degree of transparency sufficient to permit ready observation of the position of said pointer in said covered portions; said shield means being tinted to give a distinctive coloration to said covered portions.

14. In combination with an indicator having a stationary graduated dial and a pointer moving over said dial, said pointer having an end; transparent shield means before said dial and pointer defining; (1) a primary uncovered area occupying a portion of the path of movement of said end; (2) secondary slightly tinted areas forming continuations of said primary area at each end thereof; and (3) a central area of different tint and further reduced visibility; whereby a casual glance, without fixation of the eye, permits determination that the pointer is somewhere in the primary area, but the entire primary and secondary areas remain available for taking precise readings without manipulation of said shields.

WILLIAM E. DENISON.

REFERENCES CITED

The following references are of record in the file of this patent:

UNITED STATES PATENTS

| Number | Name | Date |
|---|---|---|
| 1,293,935 | Rogers | Feb. 11, 1919 |
| 1,629,680 | Cooke | May 24, 1927 |
| 1,723,390 | Tingley | Aug. 6, 1929 |
| 1,888,298 | Teesdale | Nov. 22, 1932 |
| 1,898,642 | Ogle | Feb. 21, 1933 |
| 2,006,873 | Purton | July 2, 1935 |
| 2,129,474 | Money | Sept. 6, 1938 |